United States Patent Office 3,041,880
Patented July 3, 1962

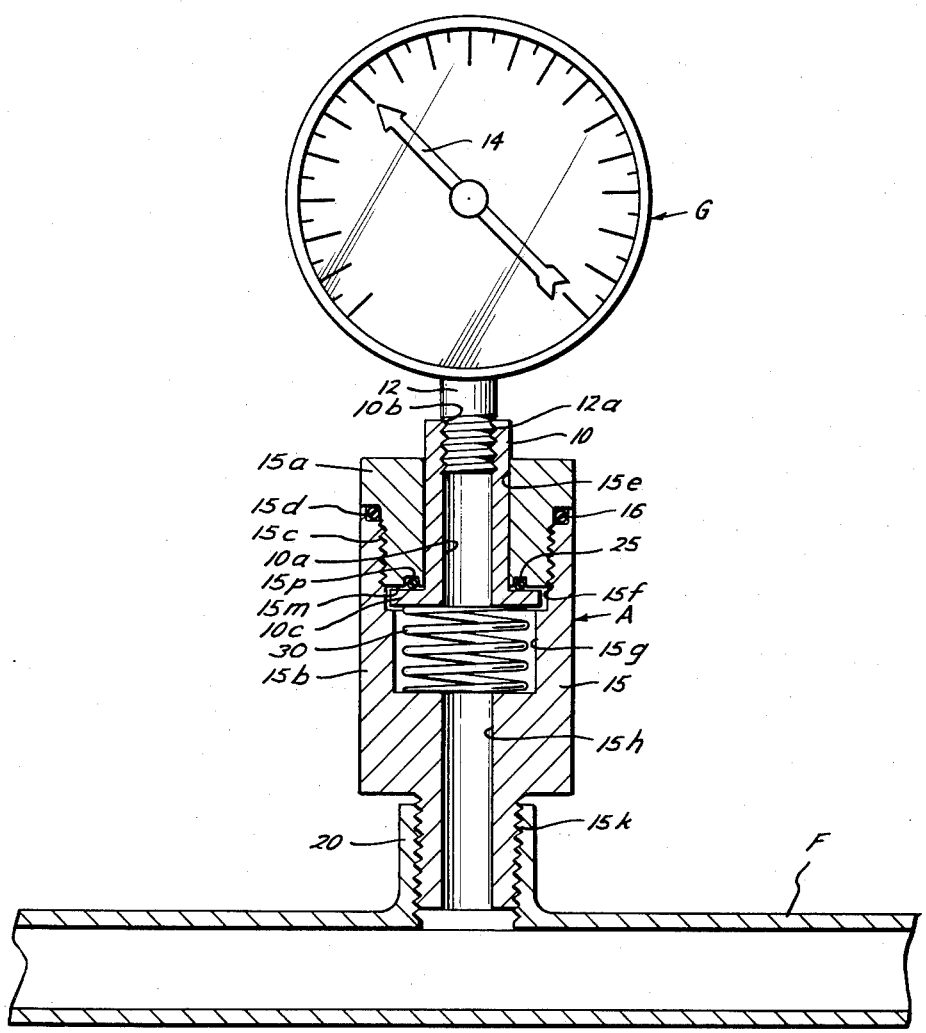
John H. McCarvell
Willis C. Carlisle
INVENTORS

3,041,880
REVOLVING GAUGE CONNECTION
John H. McCarvell and Willis C. Carlisle, both of 1525 Prince St., Houston, Tex.
Filed Dec. 3, 1959, Ser. No. 857,041
2 Claims. (Cl. 73—420)

This invention relates to new and useful improvements in means for mounting gauges and particularly to a revolving gauge connection.

In the mounting of pressure gauges and other similar gauges, a threaded stem on the gauge is threaded into a threaded sleeve or coupling on a pipe or the like until the threaded connection therebetween is sufficiently tight to prevent any appreciable further relative rotation therebetween in order to establish a tight and leakproof connection of the gauge to the sleeve or coupling. However, when the gauge is thus tightened, it frequently faces in the wrong direction or in an inconvenient direction for use. Therefore, the man installing the gauge, or someone who later uses the gauge, may either turn the gauge so as to unthread the threaded connection or so as to further tighten the threaded connection. If the gauge is turned so as to unthread the threaded connection, there is the danger of permitting fluid leakage through the threads, and therefore it is normally impossible, and certainly undesirable, to change the position of the gauge by loosening the threaded connection. If the gauge is turned in a direction to further tighten the threaded connection, the gauge must be turned with considerable force which is dangerous and undesirable because of the possible damage to the gauge itself and to the threads forming the threaded connection. Furthermore, if a gauge is turned to a desired initial position without damaging the gauge or the threaded connection, any subsequent changes in the position of the gauge are generally not possible and a new gauge or re-threading becomes necessary.

It is an object of this invention to provide a new improved means for mounting gauges which overcomes the aforesaid difficulties of the prior art mounting means and additionally provides for selectively changing the position of the gauges as frequently as desired and without damage to the gauge or its threaded connection.

Another important object of this invention is to provide a new and improved mounting means for a gauge which will be sealed against fluid leakage and which will permit rotation of the gauge to any position within a full 360° circle without damage to the mounting means and without requiring the application of damaging forces to the gauge to effect such rotation, whereby the gauge may be used in any position selected and may be moved to as many different positions as desired.

A further object of this invention is to provide a mounting means for an air pressure gauge or the like wherein the gauge has a conventional threaded stem thereon which is threaded tightly into a threaded tube which is rotatable so that thereafter the gauge and the tube are rotatable together, and wherein the threaded tube is mounted for longitudinal movement in a housing to effect a seal when air or other fluid under pressure is directed through the tube to the gauge.

Still another object of this invention is to provide a revolving gauge connection in which the gauge is resiliently mounted to obtain a fluid tight seal in the gauge connection while permitting a revolving or rotating of the gauge to different positions.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 of the drawings is a view, partly in elevation and partly in section, illustrating the preferred embodiment of this invention.

In the drawings, the letter A designates generally the apparatus of this invention which is particularly adapted to be used for connecting a gauge G to a flow line or pressure vessel F, but which may be used with any equipment wherein it is desired to mount a gauge therewith so that the gauge may be positioned in any rotational direction throughout a full 360° circle without damage to the gauge or to the connection to the flow line, pressure vessel or other equipment.

Considering the invention more in detail, the apparatus A includes a rotatable tube or connection element 10 which preferably has a longitudinal bore 10a formed therethrough. In the preferred form of the invention, the rotatable tube 10 has internal threads 10b formed in the upper portion of the bore 10a for establishing a threaded connection with a stem 12 on the gauge G which has threads 12a thereon. Such stem 12 and the threads 12a thereon are normally provided on a gauge for pressure readings such as indicated by the pressure gauge G in the drawings and in such event, the threads 12a will be threaded into the internal threads 10b of the tube 10 until a tight fluid seal connection is established therebetween. It should be understood, however, that in some instances, it may be desirable to make the tube 10 integral with the gauge G and thereby eliminate the separate stem 12. It will be appreciated that the stem 12 is hollow or tubular and establishes fluid communication from the bore 10a of the tube 10 into the interior of the gauge G for indicating the pressure on the gauge G by the pointer 14 in the known manner.

The rotatable tube 10 extends into a connector housing 15 which is preferably formed of an upper housing section 15a and a lower housing section 15b which are threaded together at interengaging threads 15c. An O-ring 16 formed of rubber or other similar resilient material is preferably positioned in an annular groove 15d at the ends of the threads 15c to prevent fluid leakage between the upper housing connector 15a and the lower housing connector 15b.

A longitudinal bore is formed through the housing connector 15 and such bore includes a longitudinal bore 15e formed in the upper housing connector 15a, and longitudinal bore sections 15f, 15g and 15h, formed in the lower housing connector 15b.

The lower housing connector 15b has an externally threaded lower end 15k which is preferably threaded tightly into an internally threaded sleeve or coupling 20 formed on the flow line or pressure vessel F in any suitable known manner. Therefore, fluid communication is established from the interior of the flow line or pressure vessel F through the longitudinal bore of the housing connector 15 to the gauge G so that the fluid under pressure in the flow line or pressure vessel F acts upon the gauge G to obtain an indication as to the amount thereof with the pointer 14, as will be more fully explained hereinafter.

The rotatable tube 10 is preferably provided with an annular flange 10c which extends laterally and which is adapted to engage an annular laterally extending shoulder 15m formed at the lower end of the upper connector 15a. The upper surface of the flange 10c may contact the shoulder 15m to provide a fluid-tight seal therebetween, but in the preferred form of the invention, a resilient or flexible seal member 25 is preferably provided between the flange 10c and the shoulder 15m. Such seal 25 would normally be an O-ring formed of rubber or other similar resilient material and could be positioned as shown in an annular groove 15p in the shoulder 15m or it may be mounted on the upper surface of the flange 10c if desired. In any event, when the tube 10 is urged upwardly, a fluid-tight seal is provided between the tube 10 and the housing 15, either by reason of an engagement of the flange 10c with the shoulder 15m or by reason of the sealing effect of a seal member such as the seal 25 between the flange 10c and the shoulder 15m.

In the form of the invention shown in the drawings, a coil spring 30 is mounted in the longitudinal bore section 15g of the lower housing connector 15b and it acts to urge the rotatable tube 10 upwardly to accomplish the aforesaid sealing action between the tube 10 and the housing 15. Also, the spring 30 supports the tube 10 and the gauge G connected therewith, but because of the resilience of the spring 30, the gauge G and the tube 10 may be moved downwardly against the action of the spring 30 so as to release the frictional engagement of the flange 10c with the seal 25 or the shoulder 15m and thereby permit unrestrained rotation of the tube 10 with respect to the housing connector 15. In that way, the gauge G may be readily rotated to any desired rotational position throughout a full 360° circle. When the gauge G has then been set at a desired position, the spring 30 again acts to return the tube 10 and the gauge G upwardly so that the flange 10c is in a sealing position with respect to the seal 25 or the surface 15m. Additionally, when the fluid under pressure is acting upwardly through the longiutdinal bore of the housing connector 15, an upward fluid force is thus exerted on the flange 10c to assist the spring 30 in maintaining the flange 10c in fluid tight contact with the seal 25 or the shoulder 15m.

In the operation or use of the apparatus A of this invention, it is believed evident from the foregoing description that the gauge G may be positioned at any desired rotational position or direction throughout a full 360° without damaging the connection to the flow line or pressure vessel F or the gauge G. Only a small amount of hand pressure is required to move the gauge G since the gauge G is mounted for unrestrained free rotation with the tube 10 when the tube 10 is lowered so that the flange 10c is out of frictional contact with the member 25 or the shoulder 15m. Such changing of the position of the gauge G may be accomplished as many times as desired without damaging the gauge G or affecting the seal. Furthermore, if after extended periods of use, the seal 25 becomes worn, it may be readily replaced by removing the upper housing connector 15a from the lower housing connector 15b and inserting a new seal 25 in the annular groove 15p. It is thus believed evident that the disadvantages of the prior art means for mounting gauges have been overcome with the present construction.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for mounting a gauge having a stem therewith on a flow line, pressure vessel, or the like, comprising:
    (a) a first connector housing member adapted to be connected to a flow line or the like and having a bore in communication with the interior of the flow line,
    (b) a second connector housing member having a bore therethrough in communication with said bore of said first connector housing,
    (c) means on said first and second connector housing members for releasably securing same together,
    (d) a rotatable tube connected to said stem and extending through the bore of said second connector housing member for rotation relative thereto,
    (e) a laterally extending shoulder on said second housing member,
    (f) a seal ring mounted on said laterally extending shoulder laterally outwardly from and out of contact with the longitudinal surface of said tube,
    (g) a laterally extending flange on said rotatable tube longitudinally movable in said bore of said first housing member and adapted to engage said seal ring to prevent fluid flow from said bore of said first housing member through said bore of said second housing member,
    (h) a lower shoulder in said first housing member, and
    (i) a spring seated on said lower shoulder in the bore of said first housing member below said flange and engageable with said flange for urging same into sealing contact with said seal ring.

2. The structure set for in claim 1, including:
    (a) an upper shoulder in said first housing member engageable by said flange to limit the downward movement of said tube away from said seal ring during rotation of said tube.

References Cited in the file of this patent

UNITED STATES PATENTS

| | | |
|---|---|---|
| 1,149,715 | Brinker | Aug. 10, 1915 |
| 1,372,022 | Helle | Mar. 22, 1921 |
| 2,261,027 | Hopkins | Oct. 28, 1941 |
| 2,620,656 | Peterson | Dec. 9, 1952 |

FOREIGN PATENTS

| | | |
|---|---|---|
| 669,827 | Germany | Jan. 5, 1939 |